US008923366B2

(12) United States Patent
Park et al.

(10) Patent No.: US 8,923,366 B2
(45) Date of Patent: Dec. 30, 2014

(54) ADAPTIVE PRECODER CYCLING

(75) Inventors: Chester Sungchung Park, San Jose, CA (US); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 40 days.

(21) Appl. No.: 13/557,306

(22) Filed: Jul. 25, 2012

(65) Prior Publication Data

US 2014/0029650 A1 Jan. 30, 2014

(51) Int. Cl.
H04B 1/38 (2006.01)

(52) U.S. Cl.
USPC ........... 375/219; 375/296; 375/316; 375/295; 375/259; 375/260; 375/285; 375/267; 375/299; 370/329; 370/252; 370/328; 370/248; 370/249

(58) Field of Classification Search
CPC .. H04B 7/0456; H04B 7/0417; H04B 7/0413; H04B 7/0639; H04B 7/0421; H04B 7/0478; H04L 1/0026; H04L 25/0202; H04L 25/0224; H04L 25/03343; H04L 25/03898; H04L 5/0007
USPC ......... 375/219, 296, 316, 295, 259, 260, 285, 375/267, 299; 370/329, 252, 328, 248, 249
See application file for complete search history.

(56) References Cited

U.S. PATENT DOCUMENTS

| 2010/0091905 | A1 | 4/2010 | Khan | |
|---|---|---|---|---|
| 2010/0195759 | A1* | 8/2010 | Gaal et al. | 375/295 |
| 2010/0284483 | A1* | 11/2010 | Jongren | 375/267 |
| 2011/0141927 | A1* | 6/2011 | Luo et al. | 370/252 |
| 2011/0255483 | A1* | 10/2011 | Xu et al. | 370/329 |
| 2012/0127948 | A1* | 5/2012 | Chung et al. | 370/329 |
| 2012/0207243 | A1* | 8/2012 | Koivisto et al. | 375/296 |
| 2013/0121276 | A1* | 5/2013 | Kim et al. | 370/329 |
| 2013/0208604 | A1* | 8/2013 | Lee et al. | 370/252 |

FOREIGN PATENT DOCUMENTS

| WO | 2009091307 A1 | 7/2009 |
|---|---|---|
| WO | 2011005533 A2 | 1/2011 |

OTHER PUBLICATIONS

3GPP TSG RAN WG1 61, R1-102828; "Specifying Basic Building Blocks of UL Multi-Antenna Transmission," Montreal, Canada, May 10-14, 2010, 8 pages.
3GPP TS 36.211, "Technical Specification Group Radio Access Network; E-UTRA; Physical Channels and Modulation," v10.3.0 (Sep. 2011), 103 pages.
3GPP TS 36.101, "Technical Specification Group Radio Access Network; E-UTRA; User Equipment (UE) Radio Transmission and Reception," v10.5.0 (Dec. 2011), 287 pages.

* cited by examiner

Primary Examiner — Siu Lee
(74) Attorney, Agent, or Firm — Coats and Bennett, PLLC

(57) ABSTRACT

Methods and apparatus are disclosed for improving a precoder selection process in a wireless communications system. In a normal precoder selection process, a precoder is selected from a codebook based on channel state information estimated from received reference signals. In between two received reference signals, a subset of precoders is cycled through and each precoder in the subset is iteratively selected for use by a transmitter to precode transmit signals. The subset of precoders may be adaptively modified based on predefined criteria.

14 Claims, 13 Drawing Sheets

| PMI | RI 0 | RI 1 | RI 2 | RI 3 |
|---|---|---|---|---|
| 0 | $\frac{1}{2}\begin{bmatrix}1\\1\\1\\-1\end{bmatrix}$ | $\frac{1}{2}\begin{bmatrix}1 & 0\\1 & 0\\0 & 1\\0 & -j\end{bmatrix}$ | $\frac{1}{2}\begin{bmatrix}1 & 0 & 0\\1 & 0 & 0\\0 & 1 & 0\\0 & 0 & 1\end{bmatrix}$ | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ |
| 1 | $\frac{1}{2}\begin{bmatrix}1\\1\\j\\j\end{bmatrix}$ | $\frac{1}{2}\begin{bmatrix}1 & 0\\1 & 0\\0 & 1\\0 & j\end{bmatrix}$ | $\frac{1}{2}\begin{bmatrix}1 & 0 & 0\\-1 & 0 & 0\\0 & 1 & 0\\0 & 0 & 1\end{bmatrix}$ | - |
| 2 | $\frac{1}{2}\begin{bmatrix}1\\1\\-1\\1\end{bmatrix}$ | $\frac{1}{2}\begin{bmatrix}1 & 0\\-j & 0\\0 & 1\\0 & 1\end{bmatrix}$ | $\frac{1}{2}\begin{bmatrix}1 & 0 & 0\\0 & 1 & 0\\1 & 0 & 0\\0 & 0 & 1\end{bmatrix}$ | - |
| 3 | $\frac{1}{2}\begin{bmatrix}1\\1\\-j\\-j\end{bmatrix}$ | $\frac{1}{2}\begin{bmatrix}1 & 0\\-j & 0\\0 & 1\\0 & -1\end{bmatrix}$ | $\frac{1}{2}\begin{bmatrix}1 & 0 & 0\\0 & 1 & 0\\-1 & 0 & 0\\0 & 0 & 1\end{bmatrix}$ | - |
| 4 | $\frac{1}{2}\begin{bmatrix}1\\j\\1\\j\end{bmatrix}$ | $\frac{1}{2}\begin{bmatrix}1 & 0\\-1 & 0\\0 & 1\\0 & -j\end{bmatrix}$ | $\frac{1}{2}\begin{bmatrix}1 & 0 & 0\\0 & 1 & 0\\0 & 0 & 1\\1 & 0 & 0\end{bmatrix}$ | - |
| 5 | $\frac{1}{2}\begin{bmatrix}1\\j\\j\\1\end{bmatrix}$ | $\frac{1}{2}\begin{bmatrix}1 & 0\\-1 & 0\\0 & 1\\0 & j\end{bmatrix}$ | $\frac{1}{2}\begin{bmatrix}1 & 0 & 0\\0 & 1 & 0\\0 & 0 & 1\\-1 & 0 & 0\end{bmatrix}$ | - |
| 6 | $\frac{1}{2}\begin{bmatrix}1\\j\\-1\\-j\end{bmatrix}$ | $\frac{1}{2}\begin{bmatrix}1 & 0\\j & 0\\0 & 1\\0 & 1\end{bmatrix}$ | $\frac{1}{2}\begin{bmatrix}0 & 1 & 0\\1 & 0 & 0\\1 & 0 & 0\\0 & 0 & 1\end{bmatrix}$ | - |
| 7 | $\frac{1}{2}\begin{bmatrix}1\\j\\-j\\-1\end{bmatrix}$ | $\frac{1}{2}\begin{bmatrix}1 & 0\\j & 0\\0 & 1\\0 & -1\end{bmatrix}$ | $\frac{1}{2}\begin{bmatrix}0 & 1 & 0\\1 & 0 & 0\\-1 & 0 & 0\\0 & 0 & 1\end{bmatrix}$ | - |
| 8 | $\frac{1}{2}\begin{bmatrix}1\\-1\\1\\1\end{bmatrix}$ | $\frac{1}{2}\begin{bmatrix}1 & 0\\0 & 1\\1 & 0\\0 & 1\end{bmatrix}$ | $\frac{1}{2}\begin{bmatrix}0 & 1 & 0\\1 & 0 & 0\\0 & 0 & 1\\1 & 0 & 0\end{bmatrix}$ | - |
| 9 | $\frac{1}{2}\begin{bmatrix}1\\-1\\j\\-j\end{bmatrix}$ | $\frac{1}{2}\begin{bmatrix}1 & 0\\0 & 1\\1 & 0\\0 & -1\end{bmatrix}$ | $\frac{1}{2}\begin{bmatrix}0 & 1 & 0\\1 & 0 & 0\\0 & 0 & 1\\-1 & 0 & 0\end{bmatrix}$ | - |
| 10 | $\frac{1}{2}\begin{bmatrix}1\\-1\\-1\\-1\end{bmatrix}$ | $\frac{1}{2}\begin{bmatrix}1 & 0\\0 & 1\\-1 & 0\\0 & 1\end{bmatrix}$ | $\frac{1}{2}\begin{bmatrix}0 & 1 & 0\\0 & 0 & 1\\1 & 0 & 0\\1 & 0 & 0\end{bmatrix}$ | - |

| PMI | RI | | | |
|---|---|---|---|---|
| | 0 | 1 | 2 | 3 |
| 11 | $\frac{1}{2}\begin{bmatrix}1\\-1\\-j\\j\end{bmatrix}$ | $\frac{1}{2}\begin{bmatrix}1 & 0\\0 & 1\\-1 & 0\\0 & -1\end{bmatrix}$ | $\frac{1}{2}\begin{bmatrix}0 & 1 & 0\\0 & 0 & 1\\1 & 0 & 0\\-1 & 0 & 0\end{bmatrix}$ | - |
| 12 | $\frac{1}{2}\begin{bmatrix}1\\-j\\1\\-j\end{bmatrix}$ | $\frac{1}{2}\begin{bmatrix}1 & 0\\0 & 1\\0 & 1\\1 & 0\end{bmatrix}$ | - | - |
| 13 | $\frac{1}{2}\begin{bmatrix}1\\-j\\j\\-1\end{bmatrix}$ | $\frac{1}{2}\begin{bmatrix}1 & 0\\0 & 1\\0 & -1\\1 & 0\end{bmatrix}$ | - | - |
| 14 | $\frac{1}{2}\begin{bmatrix}1\\-j\\-1\\j\end{bmatrix}$ | $\frac{1}{2}\begin{bmatrix}1 & 0\\0 & 1\\0 & 1\\-1 & 0\end{bmatrix}$ | - | - |
| 15 | $\frac{1}{2}\begin{bmatrix}1\\-j\\-j\\1\end{bmatrix}$ | $\frac{1}{2}\begin{bmatrix}1 & 0\\0 & 1\\0 & -1\\-1 & 0\end{bmatrix}$ | - | - |
| 16 | $\frac{1}{2}\begin{bmatrix}1\\0\\1\\0\end{bmatrix}$ | - | - | - |
| 17 | $\frac{1}{2}\begin{bmatrix}1\\0\\-1\\0\end{bmatrix}$ | - | - | - |
| 18 | $\frac{1}{2}\begin{bmatrix}1\\0\\j\\0\end{bmatrix}$ | - | - | - |
| 19 | $\frac{1}{2}\begin{bmatrix}1\\0\\-j\\0\end{bmatrix}$ | - | - | - |

Figure 5 (continued)

ADAPTIVE PRECODER CYCLING

TECHNICAL FIELD

The present invention relates generally to precoding transmit signals and, more specifically, to selection of a precoder from a set of pre-defined matrices to precode transmit signals in a multiple-input multiple-output (MIMO) wireless communications system.

BACKGROUND

A MIMO communications system employs multiple antennas at both the transmitter and the receiver. A MIMO system can be used to achieve improved system capacity, signal coverage and higher user data rates. A MIMO system also provides the possibility of very high bandwidth utilization.

A MIMO system comprises NT transmit antennas and NR receive antennas. Multiple signal streams are transmitted from the transmit antennas and received by the receive antennas. Each signal stream in the MIMO system is transmitted in a separate layer. In an NT×NR MIMO system, the number of signal streams or layers, NL, is smaller than or equal to min {NT, NR}. Generally, an MIMO transmitter utilizes precoding techniques to precode transmit signals with a precoding matrix. A precoding matrix is also referred to as a precoder in the present application. Both terms are used interchangeably. Precoding techniques help reduce interference between the layers and improve signal-to-noise ratio at the receiver.

In practice, a set of precoders may be compiled to form a predefined codebook. Based on channel state information (CSI) estimated by a receiver, a suitable precoder can be selected from the codebook to precode transmit signals at a transmitter.

Often, channel state information is derived from received reference signals. For example, demodulation reference signals (DM-RS) or sounding reference signals (SRS) can be used in channel state information estimation. However, DM-RS signals are precoded. The channel state information obtained from a precoded DM-RS reference signal may misrepresent the actual channel conditions of the physical channels. Further, the reference signals may be transmitted too infrequently to allow prompt or timely estimation of channel state information.

When a precoder is selected based on incomplete, inaccurate, or stale channel state information, the precoder may be less effective in cancelling interference between signal streams or in improving the signal-to-interference-plus-noise-ratio at the receiver. The transmit signals may exhibit high interference or high noise level.

Accordingly, techniques are needed to improve precoder selections in a MIMO system when channel state information estimated from certain types of reference signals does not accurately reflect the current channel conditions.

SUMMARY

The present disclosure provides methods and apparatus for improving precoder selection in a wireless communications system. More specifically, particular embodiments of the present invention provide a precoder selection method that periodically selects one or more precoders from a subset of precoders in addition to a normal precoder selection process. The method may be implemented in a transmitter or a receiver.

In some implementations, the normal precoder selection process selects a precoder from a pre-defined codebook based on channel state information estimated from certain received reference signals. A subset of precoders may be constructed from a pre-defined codebook. The subset of precoders is cycled through during each duty period when each precoder is iteratively selected from the subset. The precoder cycling is performed every cycling period. The selection of a precoder by cycling through the subset of precoders may be performed by a receiver or a transmitter. The selected precoder is used by the transmitter to precode transmit signals.

In some implementations, the subset of precoders is adaptively modified by adding or deleting one or more precoders. The addition or deletion may be based on a pre-defined criterion.

Of course, the present invention is not limited to the features, advantages, and contexts summarized above, and those familiar with wireless communications systems and technologies will recognize additional features and advantages upon reading the following detailed description and upon viewing the accompanying drawings. Notably, while terminologies specific to 3GPP LTE are used in this application, the ideas and concept of the invention are equally applicable to other wireless systems, including but not limited to WCDMA, WiMax, UMA, GSM and WLAN.

BRIEF DESCRIPTION OF THE DRAWINGS

FIGS. 4 and 5 illustrate exemplary codebooks for spatial multiplexing.

DETAILED DESCRIPTION

Figure 1:
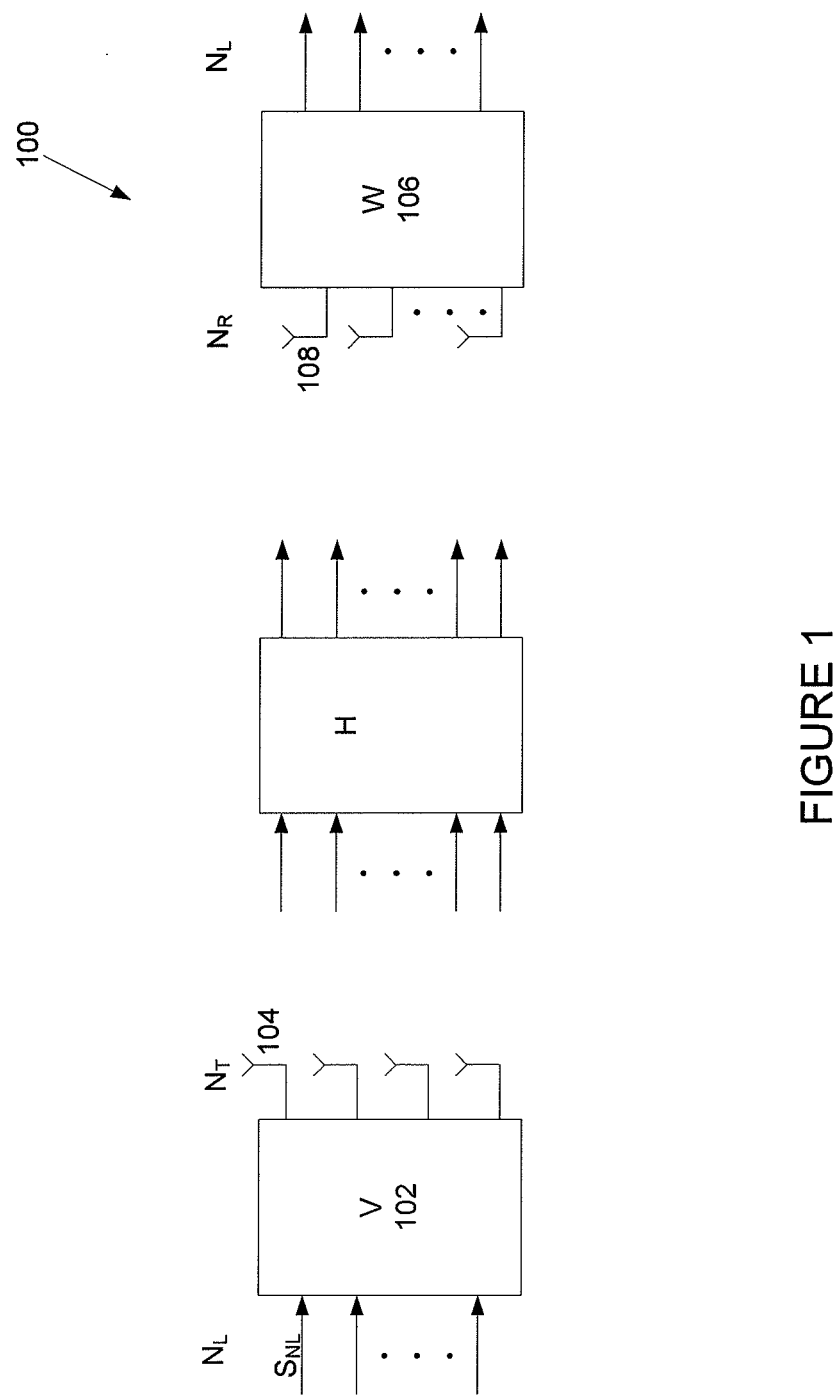
FIG. 1 illustrates a block diagram of a MIMO communications system.

Referring now to the drawings, FIG. 1 illustrates a MIMO communications system. A transmitter 102 is equipped with multiple antennas 104. The multi-antenna transmitter 102 utilizes a precoding matrix, V, to precode the transmit signals $\vec{S}_{N_L}$ before transmitting the signals via the antennas 104. The precoding matrix, V, is applied to NL input signals to generate NT transmit signals.

The precoded signal is a multi-stream signal and comprises NL layers. The precoded signal propagates through the physical channels. The channel conditions of the channels are represented by channel response H. The precoded signal is received by a receiver 106. The receiver 106 is also equipped with multiple antennas 108. At the receiver 106, the received signals are demodulated and combined with combining weights W. The relationship between the transmit signal $\vec{s}_{N_L}$ and the demodulated signal $\vec{r}_{N_L}$ is shown in Equation (1).

$$\vec{r}_{N_L} = W \cdot H \cdot V \cdot \vec{s}_{N_L} \quad (1)$$

Theoretically, with a carefully chosen precoder, V, impairments due to interference between the multiple signal streams can be effectively eliminated or reduced in the signals received in the receiver 106. For instance, precoder V can be selected such that W·H·V becomes a diagonal matrix, in which case each signal stream in the received signal $\vec{r}_{N_L}$ is linearly related to the corresponding signal stream in the transmit signal $\vec{s}_{N_L}$ without interference from other multiple signal streams.

In a MIMO system, a multi-antenna receiver estimates channel state information (CSI) based on reference signals transmitted by a multi-antenna transmitter. Examples of reference signals include SRS and DM-RS signals. Based on the estimated CSI, the receiver selects a precoder and informs the transmitter of the selected precoder for use in precoding transmit signals. Alternatively, the receiver can transmit the CSI estimates to the transmitter. The transmitter selects a precoder based on the CSI estimates.

Figure 2:
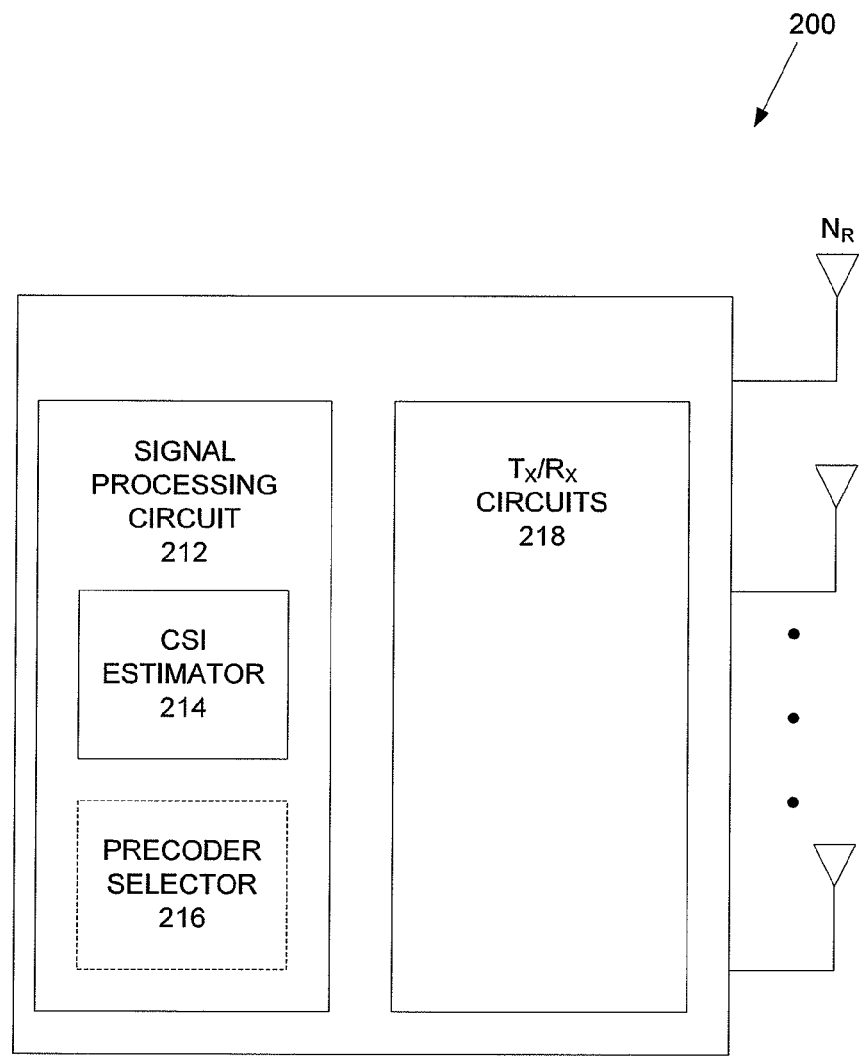
FIG. 2 illustrates an exemplary network node.

FIG. 2 illustrates an exemplary receiving device 200 in a MIMO system implementing adaptive precoder cycling as hereinafter described. For uplink communications, the receiving device may comprise a base station (also known as a NodeB). For downlink communications, the receiving device may be in a wireless terminal (also known as a user equipment).

The receiving device comprises a transceiver circuit 218, a signal processing circuit 212, and a plurality of antennas. The transceiver circuit includes a receiver to receive signals from a transmitting device on one or more antennas, and a transmitter to transmit signals to the transmitting device using one or more antennas. The signal processing circuit 212 processes the signals received and transmitted by the receiving device. The signal processing circuit 212 may comprise one or more processors, microcontroller, hardware, or a combination thereof. The signal processing circuit 212 comprises a CSI estimator 214 and an optional precoder selector 216 for implementing codebook-based precoding. As will be hereinafter described in more detail, the CSI estimator 214 generates estimates of channel state information based on a received reference signals. The precoder selector 216 then selects a precoder from a pre-compiled codebook based on the channel state information estimated by the CSI estimator 214. The optional precoder selector 216 may be included in the transmitting device, in which case the CSI is signaled to the transmitting device.

Figure 3:
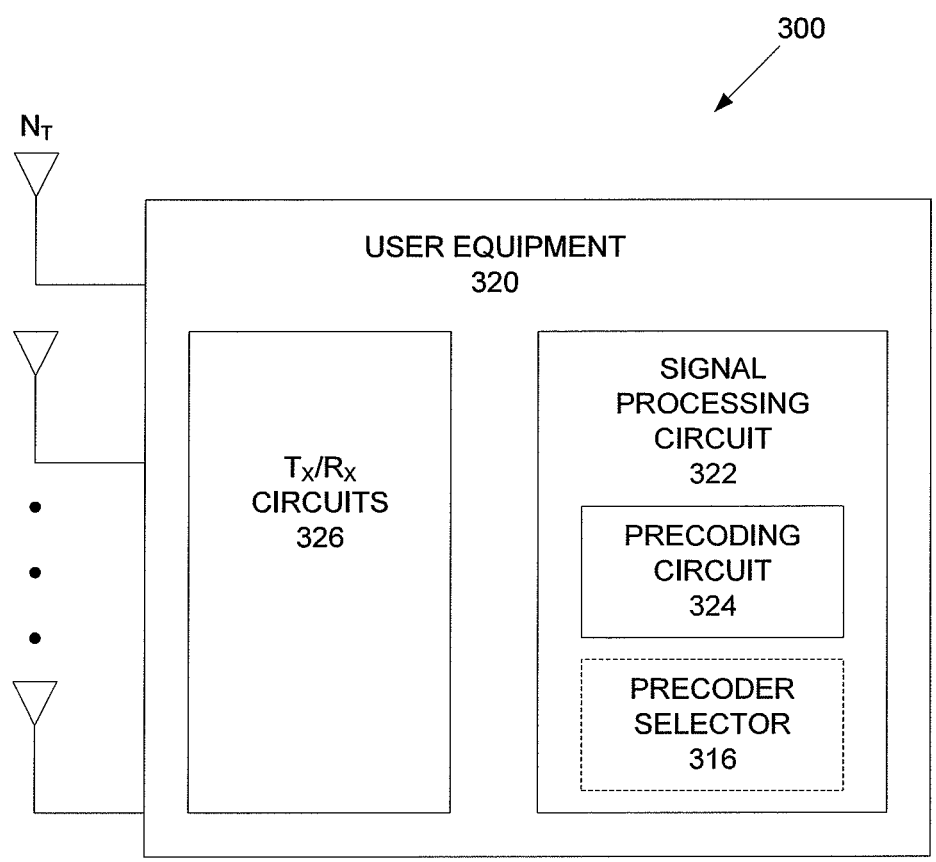
FIG. 3 illustrates an exemplary user terminal.

FIG. 3 illustrates an exemplary transmitting device 300 in a MIMO system implementing adaptive precoder cycling as hereinafter described. For uplink communications, the transmitting device may comprise a user terminal or user equipment. For downlink communications, the transmitting device may comprise a base station or NodeB.

The transmitting device 300 comprises a transceiver circuit 326, a signal processing circuit 322, and a plurality of antennas. The transceiver circuit 326 includes a receiver to receive signals on one or more antennas, and a transmitter to transmit signals using one or more antennas. The signal processing circuit 322 processes the signals received and transmitted by the receiving device. The signal processing circuit may comprise one or more processors, microcontroller, hardware, or a combination thereof. The signal processing circuit includes a precoding circuit 324 to precode the transmit signals. Optionally, the transmitting device 300 may further comprise a precoder selector 316 similar to the precoder selector 216 included in the receiving device 200. The precoder selector 316 selects a precoder based on the CSI that is estimated by the CSI estimator 214 and transmitted from the receiving device 200 to the transmitting device 300.

As note above, the receiving device 200 and transmitting device 300 are configured to implement codebook-based precoding. With codebook based precoding, a set of predefined precoders are stored in a codebook. The receiving device selects a precoder from the codebook based on the current channel conditions and sends the precoder selection to the transmitting device. The transmitting device may either accept the precoder selection received from the receiving device, or select a different precoder.

Figure 4:

FIGS. 4 and 5 illustrate exemplary codebooks that may be employed in a MIMO system. The exemplary codebooks as shown in FIGS. 4 and 5 are a table containing two indices, PMI (Precoding Matrix Indicator) and RI (Rank Indicator). The values in each column, r, represent antenna spreading weights, i.e., the precoder coefficients for the r-th layer. The PMI index is an index for the antennas. For example, in FIG. 4, in column r=1, all values are empty except element (0, 1), which has a value of $$\frac{1}{\sqrt{2}} \begin{bmatrix} 1 & 0 \\ 0 & 1 \end{bmatrix}.$$

This indicates that there is only one antenna transmitting (PMI=0). FIG. 4 illustrates an exemplary codebook including precoder matrices that can be used for a MIMO system capable of transmitting up to 2 layers. FIG. 5, on the other hand, illustrates an exemplary codebook that can be used for a MIMO system capable of transmitting up to 4 layers.

Based on the estimated channel state information, the transmitting device 200 or the receiving device 300 selects a precoding matrix from a codebook, such as the exemplary codebook shown in FIG. 4 or 5. The precoder selection takes place upon receiving a reference signal that can be used for CSI estimation, for example, a DM-RS reference signal or a SRS reference signal.

DM-RS reference signals are transmitted on a Physical Uplink Shared Channel (PUSCH) and are precoded. The CSI obtained from DM-RS reference signals does not reflect the channel conditions of the physical channels. On the other hand, SRS reference signals are not precoded and the CSI information obtained from SRS reference signals provides knowledge of the physical channels. However, SRS reference signals require extra signaling overhead and are not transmitted as frequently as desired to ensure accurate or timely CSI estimation. The desired frequency of SRS transmissions depends on how fast the channel conditions and/or interference vary. The Doppler spread of a channel often is a good indicator of the scale of time variation of the channel conditions and interference.

In some embodiments, the frequency of SRS transmissions may be configured to be once every 2 ms to once every 320 ms. When SRS transmissions are too infrequent to guarantee accurate CSI estimation, DM-RS reference signals can be used to enhance CSI estimations. The drawback of using DM-RS for CSI estimation is that the CSI obtained from DM-RS reference signals is mainly confined to the precoder used by the PUSCH subframe. Therefore, if the PUSCH uses a certain precoding matrix selected based on the CSI information obtained from the DM-RS signals, the same precoding matrix may be selected if the PUSCH channel condition remains relative stable. And if the same precoding matrix has been used for a while, there is no opportunity to measure or update the CSI information corresponding to other precoder matrices. Therefore, only when newly measured channel state information, e.g., SINRs for the PUSCH precoder, becomes smaller than the SINRs maintained for the other precoders, which have not been updated for a while since these precoders have not been used, will a different precoding matrix be selected. The precoder selected based on outdated SINR information may be less than optimal in reducing interference.

Figure 6:
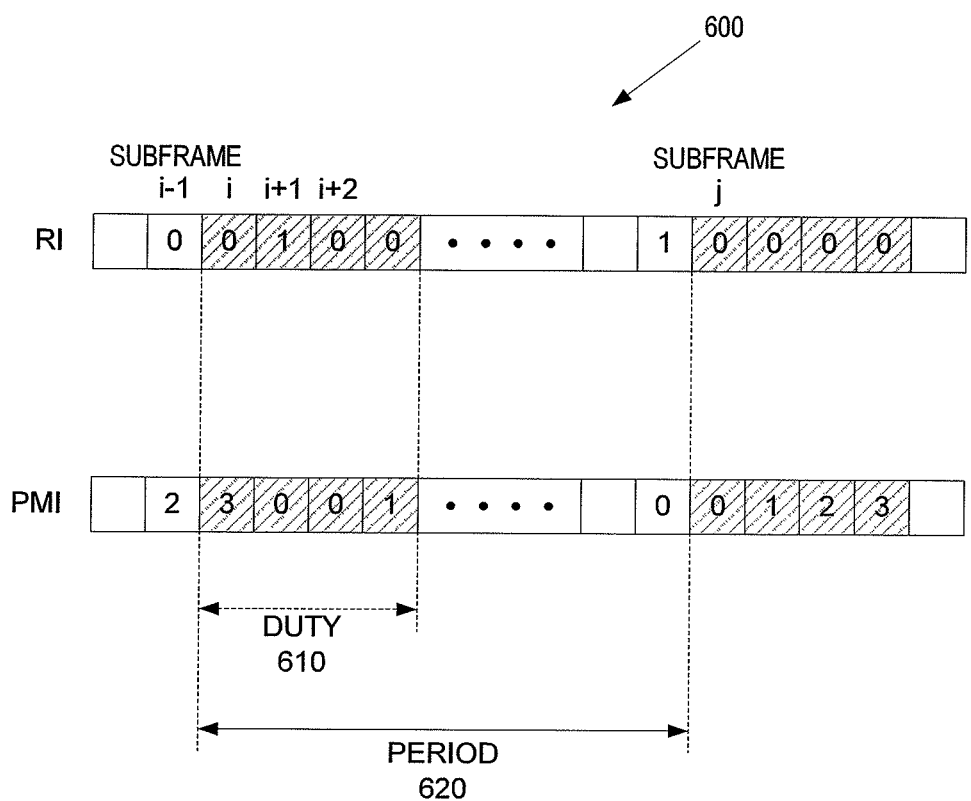
FIG. 6 illustrates an exemplary method of precoder cycling.

To overcome such drawbacks, a subset of precoding matrices may be selected and the transmitter may be required to cycle through the precoder subset according to a cycling pattern. The cycling pattern may be described by a cycling period, a duty period, and a cycling offset. The cycling period describes how often cycling through of the subset of precoding matrices takes place. The duty period describes the period of time it takes to cycle through the subset of precoding matrices. And the cycling offset describes the separation time between the last SRS transmission and the start of a precoder cycling period. For example, FIG. 6 illustrates an exemplary cycling pattern over a series of subframes. The precoding matrix selected for each subframe is indicated by the RI and PMI index of the precoding matrix. The RI index is shown in the upper line of boxes and the PMI index is shown in the lower line of boxes. The shaded subframes are subframes during which precoder cycling is activated and the un-shaded subframes are subframes when normal precoder selection is used.

In FIG. 6, the subset of precoders is selected from the codebook shown in FIG. 4. The subset of precoders includes $$\{(RI,PMI)\}=\{(0,0),(0,1),(0,2),(0,3),(1,0)\} \quad \text{Eq. (2)}.$$

In this example, precoders (RI, PMI)=(0, 4), (0, 5) are not included in the subset because they yield small or unacceptable SINRs. As shown in FIG. 6, the first cycling period 620 starts with precoder (RI, PMI)=(0, 3) in subframe i, the first subframe in duty period 610. After precoder (RI, PMI)=(0, 3), precoder (RI, PMI)=(1, 0) is selected for use in the next subframe, subframe i+1. Similarly, the second cycling period starts with using precoder (RI, PMI)=(0, 0) in the first subframe, subframe j, in the cycling period after the cycling period 620. This is because (RI, PMI)=(0, 0) is the precoder after (RI, PMI)=(1, 0) in the precoder subset shown in Eq(2). Precoder (RI, PMI)=(1, 0) is used in the subframe right before subframe j.

Figure 7:
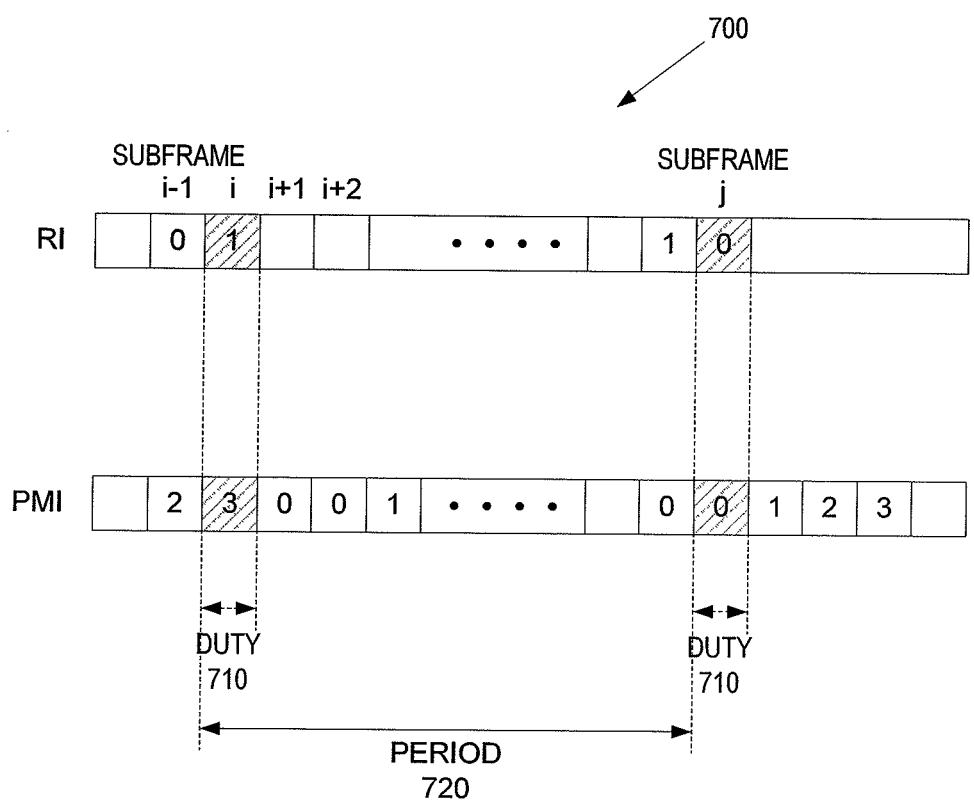
FIG. 7 illustrates another exemplary method of precoder cycling.

In the embodiment shown in FIG. 7, only the RI index is cycled. The PMI index remains the same. This tends to improve the performance of the MIMO system, in cases where RI selection plays a more important role than PMI selection in affecting the system performance or where PMI cycling consumes too much overhead.

In some embodiments, the cycling pattern can be varied depending on the current conditions. Of course, the transmitting device 300 and the receiving device 200 need to be informed of the varied cycling pattern in advance. In general, the longer the cycling pattern, the more CSI information the receiving device 200 can gather. But the longer the cycling pattern, the more signaling overhead the MIMO system has to provide. For example, in FIG. 6 and FIG. 7, the cycling duty is 4 subframes and 1 subframe respectively. The ratio of the duty period to the cycling period determines the cycling overhead. Higher cycling duty period or lower cycling period means higher cycling overhead. In other words, it is desirable to make the cycling duty period as short as possible, while cycling all necessary precoding matrices within the duty period.

In some implementations, the cycling offset is configured such that the precoder cycling can complement infrequent SRS transmission. For example, as illustrated in FIG. 8a, precoder cycling may be scheduled somewhere midway in between two consecutive SRS transmissions, instead of immediately before or after an SRS transmission, as shown in FIG. 8b. The receiver performance comparison between these two options may depend on many systems variables such as Doppler shift and received SINR.

It is advantageous to adapt the precoder cycling based on channel conditions and system performance. Adaptive precoder cycling avoids unnecessary precoder cycling if a selected precoding matrix is adequate or satisfactory. Precoder cycling parameters, such as cycling period, duty period and cycling offset, may be adapted dynamically. The subset of precoder matrices can be modified dynamically. For example, if a precoding matrix used in a precoder cycling is seldom selected by the normal precoder selection, it may be excluded from the subset used in precoder cycling. The assumption is that such precoding matrix is probably not a good match for the prevailing channel conditions. By removing the unsuitable precoding matrices from precoder cycling, the duty period can be shortened and the cycling overhead can be reduced.

Figure 8:
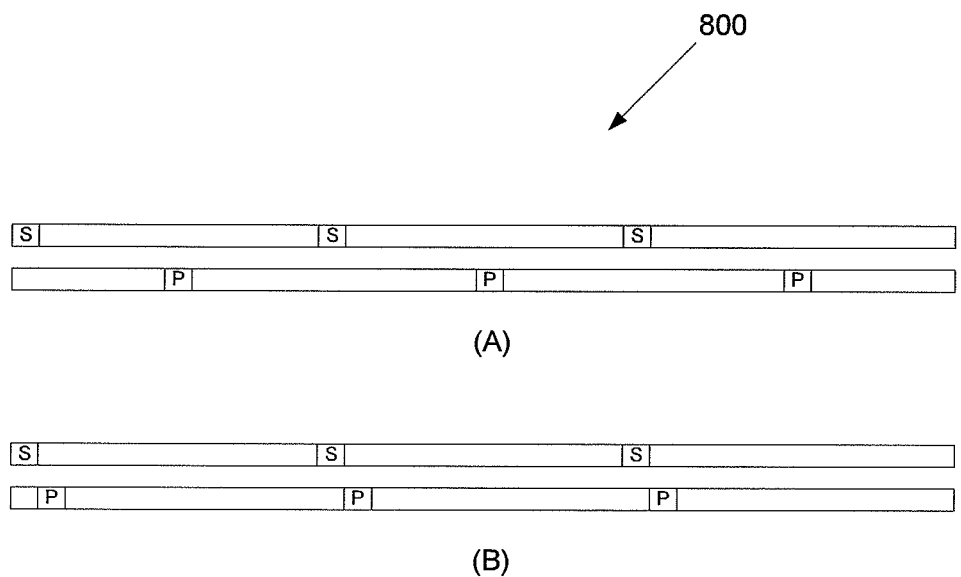
FIG. 8 illustrates two exemplary precoder cycling schedules.
Figure 9:
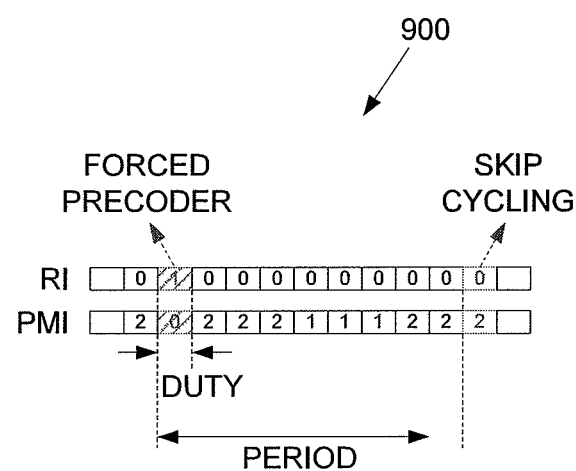
FIG. 9 illustrates an exemplary method of adaptive precoder cycling.

FIG. 9 illustrates one exemplary adaptive precoder cycling. In the first precoder cycling period, the adaptive precoder cycling comprises one precoding matrix (RI, PMI)=(1, 0). However, the normal precoder selection uses only (RI, PMI) =(0, 1) or (0, 2). The precoder (RI, PMI)=(1, 0) is never selected. It may be assumed that the precoding matrix (RI, PMI)=(1, 0) does not optimize the system performance and should not be used in the precoder cycling. As shown in FIG. 9, in the second precoder cycling period, the precoding cycling is skipped entirely. In some implementations, each precoding matrix in the subset is tracked to see how many times it is used over a cycling period. A utilization metric may be maintained for each precoder in the subset. The utilization metric describes the extent to which each pre-coder has actually been selected for use by the transmitter. If one precoding matrix is never used during a previous cycling period, that precoding matrix may be excluded from the subset. This helps shortening the duty period, reducing the signaling overhead associated with precoder cycling, and improves system throughput, as illustrated in FIGS. 8 and 9.

Figure 10:
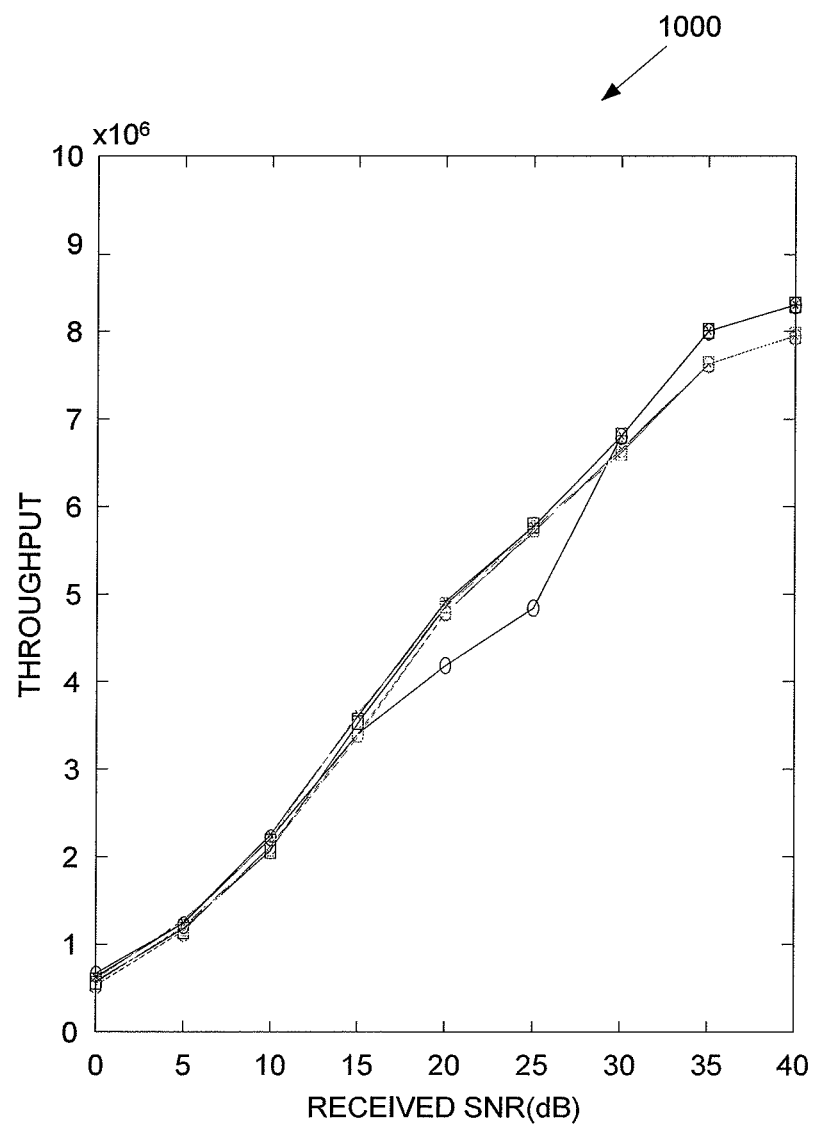
FIG. 10 illustrates an exemplary throughput performance for non-adaptive precoder-cycling.

FIG. 10 shows the simulated throughput performance as a function of the received SNR in a non-adaptive precoder selection scheme. The precoder selection is based on both DM-RS and SRS signals. The dotted lines represent the throughput performance when there is no precoder cycling and the solid lines represent the throughput performance when non-adaptive precoder cycling is used. In FIG. 10, the curves with circle marks represent the performance with a SRS periodicity of 320 ms and the curves with square marks represent the performance with a SRS periodicity of 20 ms. As shown in FIG. 10, without precoder cycling, the throughput performance increases as the SRS periodicity increases. With precoder cycling, the receiver becomes less sensitive to SRS periodicity. This may be due to the improved accuracy in CSI estimation when periodically different precoding matrices are selected for CSI estimation.

It should be noted that precoder cycling may cause performance loss in a scenario in which the SNR is high. This is because the normal precoder selection almost always selects the full-rank precoding matrix and precoder cycling may select low-rank precoding matrices that are not suitable for the high SNR scenario. In such case, non-adaptive precoder cycling may actually lead to throughput loss. Adaptive precoder cycling should be implemented instead.

Figure 11:
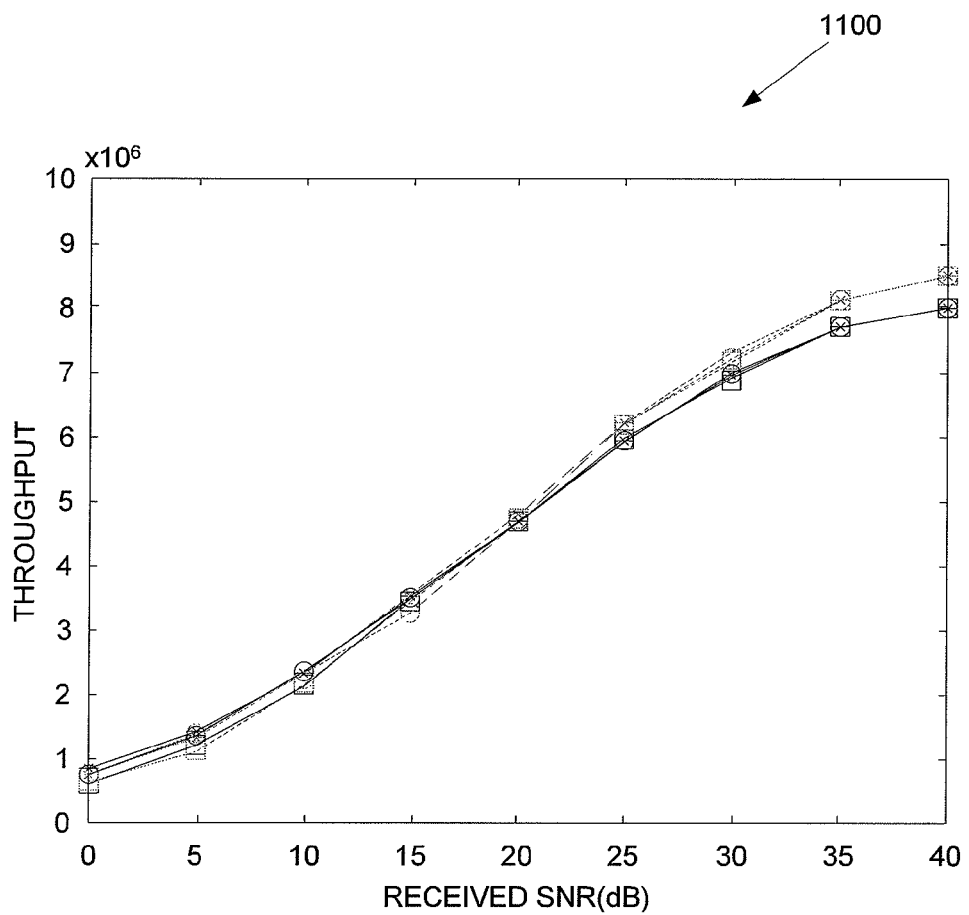
FIG. 11 illustrates an exemplary throughput performance for adaptive precoder cycling.

FIG. 11 illustrates the simulated throughput performance comparison between an adaptive precoder selection scheme and a non-adaptive precoder selection scheme. In FIG. 11, the dotted lines represent non-adaptive precoder selection and the solid lines represent adaptive precoder selection. Same as in FIG. 10, the curves with circle marks represent the performance with a SRS periodicity of 320 ms and the curves with square marks represent the performance with a SRS periodicity of 20 ms. In FIG. 11, in the high SINR region, the throughput performance of adaptive precoder cycling is higher than the performance of non-adaptive precoder cycling.

Figure 12:
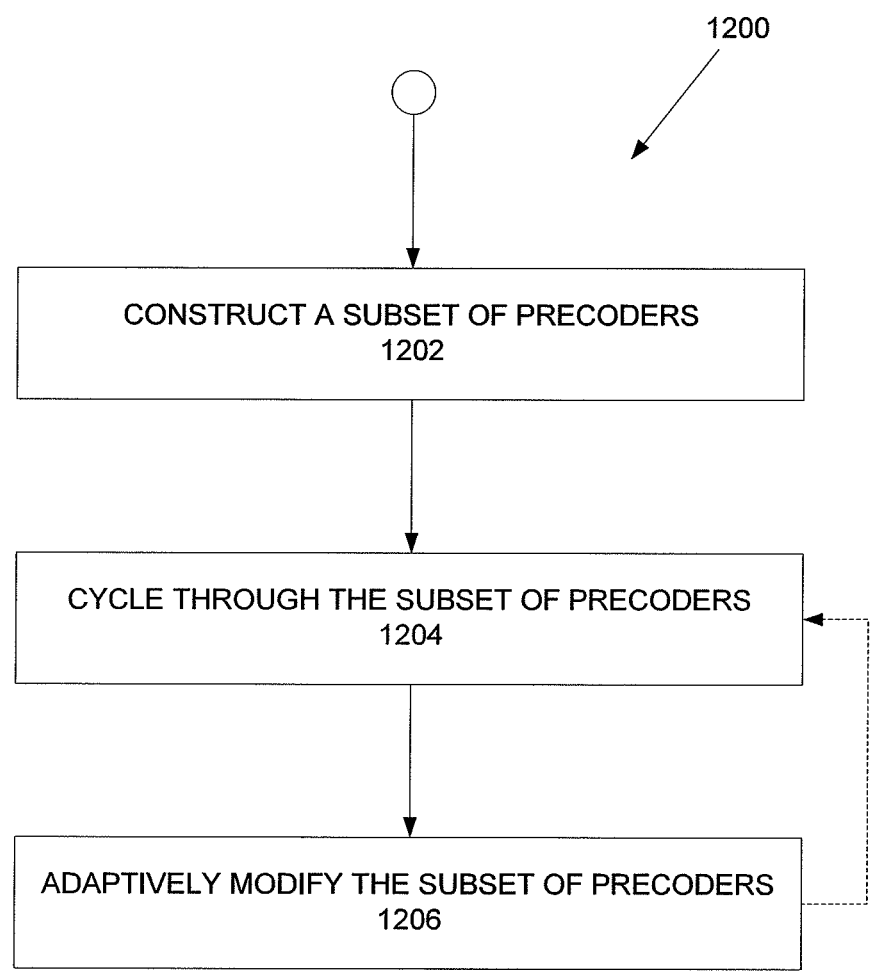
FIG. 12 illustrates an exemplary adaptive precoder cycling process.

FIG. 12 illustrates an exemplary adaptive precoder cycling process according to one embodiment of the invention. The selection process can be implemented by the precoder selector 216 or 316. A subset of precoders is first constructed for use during precoder cycling (step 1202). During a cycling period, each precoder in the subset of precoders is iteratively selected to precode transmit signals at a transmitter (step 1204). The subset of precoders is adaptively or dynamically modified before the subset of precoders is cycled through again (step 1206).

The foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method for selecting a pre-coder to be used by a transmitter to pre-code transmit signals in a multiple-input multiple output (MIMO) communications system, comprising:
   constructing a subset of pre-coders from a predetermined codebook that includes a plurality of pre-coders;
   cycling through the subset of pre-coders during a cycling period by iteratively selecting individual pre-coders in the subset of pre-coders to be used by the transmitter for pre-coding a reference signal, wherein for each iteratively selected precoder, channel state information is updated based on measurement of the reference signal and periodic measurements of a second reference signal that has not been pre-coded by the transmitter, wherein said cycling through the subset of pre-coders is performed in between consecutive ones of the periodic measurements, and wherein each iteratively selected pre-coder is fed back from the receiver to the transmitter; and
   adaptively modifying the subset of pre-coders to be cycled through, by adding to the subset one or more suitable pre-coders or deleting from the subset one or more unsuitable pre-coders, based on a predetermined criterion.

2. The method of claim 1, wherein the method is implemented in the transmitter, and wherein for each iteratively selected precoder, channel state information is updated based on a measurement of the reference signal and fed back from a receiver to the transmitter.

3. The method of claim 1, wherein the predetermined criterion comprises a utilization metric for each of the subset of pre-coders describing the extent to which that pre-coder has actually been selected for use by the transmitter based on said channel state information.

4. The method of claim 3, wherein said adaptively modifying comprises removing one or more pre-coders from the subset having a utilization metric indicating that the pre-coder has not been selected for at least a threshold number of times over a predetermined interval of time.

5. The method of claim 4, wherein said cycling is performed during each of a plurality of cycling periods, and wherein said predetermined interval of time is a predetermined number of cycling periods.

6. The method of claim 1, wherein said cycling is selectively performed if at least two pre-coders are included in said subset.

7. The method of claim 1, wherein the constructed subset of pre-coders includes every pre-coder defined in the predetermined codebook.

8. A wireless multi-antenna transceiver configured to select a pre-coder for pre-coding transmit signals, said transceiver comprising a transmitting and receiving circuit, a signal processing circuit, said signal processing circuit configured to:
   construct a subset of pre-coders from a predetermined codebook that includes a plurality of pre-coders;
   cycle through the subset of pre-coders by iteratively selecting individual pre-coders in the subset of pre-coders for pre-coding a reference signal, wherein for each iteratively selected precoder, channel state information is updated based on measurement of the reference signal and periodic measurements of a second reference signal that has not been pre-coded, wherein said cycling through the subset of pre-coders is performed in between consecutive ones of the periodic measurements, and wherein each iteratively selected pre-coder is fed back from the transceiver to a transmitter to pre-code transmit signals; and
   adaptively modify the subset of pre-coders to be cycled through, by adding to the subset one or more suitable pre-coders or deleting from the subset one or more unsuitable pre-coders, based on a predetermined criterion.

9. The transceiver of claim 8, the signal processing circuit further configured to receive from a receiver updated channel state information based on a measurement of the reference signal.

10. The transceiver of claim 8, wherein the predetermined criterion comprises a utilization metric for each of the subset of pre-coders describing the extent to which that pre-coder has actually been selected for use by the transmitter based on said channel state information.

11. The transceiver of claim 10, wherein said adaptively modifying comprises removing one or more pre-coders from the subset having a utilization metric indicating that the pre-coder has not been selected for at least a threshold number of times over a predetermined interval of time.

12. The transceiver of claim 11, wherein said cycling is performed for each of a plurality of cycling periods, wherein said predetermined interval of time is a predetermined number of cycling periods.

13. The transceiver of claim 11, wherein said cycling is selectively performed if at least two pre-coders are included in said subset.

14. The transceiver of claim 11, wherein the constructed subset of pre-coders includes every pre-coder defined in the predetermined codebook.

* * * * *